(12) United States Patent
Lamers et al.

(10) Patent No.: US 9,023,430 B2
(45) Date of Patent: May 5, 2015

(54) METHOD OF FORMING MULTI-COMPONENT COMPOSITE COATING COMPOSITIONS ON SUBSTRATES USING COMPACT PROCESSES

(75) Inventors: Paul H. Lamers, Allison Park, PA (US); Christopher A. Verardi, Pittsburgh, PA (US); Michele L. Meli, Ambridge, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 657 days.

(21) Appl. No.: 13/273,432

(22) Filed: Oct. 14, 2011

(65) Prior Publication Data

US 2013/0095316 A1 Apr. 18, 2013

(51) Int. Cl.
*C09D 167/00* (2006.01)
*C23C 28/00* (2006.01)
*B05D 7/00* (2006.01)
*C09D 5/02* (2006.01)
*B05D 7/14* (2006.01)

(52) U.S. Cl.
CPC .............. *C23C 28/00* (2013.01); *Y10T 428/264* (2015.01); *B05D 7/14* (2013.01); *B05D 7/542* (2013.01); *C09D 5/022* (2013.01); *C09D 167/00* (2013.01)

(58) Field of Classification Search
None
See application file for complete search history.

(56) References Cited

U.S. PATENT DOCUMENTS

| 4,558,090 A | 12/1985 | Drexler et al. |
| 6,180,181 B1 | 1/2001 | Verardi et al. |
| 7,163,979 B2 | 1/2007 | Okazaki et al. |

*Primary Examiner* — William Phillip Fletcher, III
(74) *Attorney, Agent, or Firm* — Krisanne Shideler

(57) ABSTRACT

The present invention is directed to a method for forming a composite coating on a substrate. The method comprises:
(A) applying a first, waterborne coating composition to a surface of the substrate, the composition comprising:
(a) a polymeric component containing acid functional groups and an additional, different functional group;
(b) a curing agent having functional groups reactive with the additional functional groups on the polymeric component; and
(c) microgel particles different from the curing agent, prepared from a diamine and an acid functional polyisocyanate, wherein the polyisocyanate contains an average of 0.75 acid functional groups per molecule and the wherein the polyisocyanate has at least three isocyanate functional groups, to form a substantially uncured first coating thereon; and
(B) applying a second coating composition to the uncured first coating, to form a substantially uncured secondary coating thereon.

Also provided are coated substrates prepared using the above method.

8 Claims, No Drawings

METHOD OF FORMING MULTI-COMPONENT COMPOSITE COATING COMPOSITIONS ON SUBSTRATES USING COMPACT PROCESSES

FIELD OF THE INVENTION

The present invention relates to methods of forming multi-component composite coatings on substrates using compact (wet-on-wet) processes, and to the coated substrates themselves.

BACKGROUND OF THE INVENTION

In industrial coating processes such as those used in automotive manufacturing, efforts are constantly made to reduce energy consumption and costs, as well as atmospheric pollution caused by volatile solvents which are emitted during a painting process. However, it is often difficult to achieve high quality, smooth coating finishes, such as are required in the automotive industry, without using organic solvents in the paint compositions. Solvents improve the flow and leveling of a coating during application to a substrate, thereby improving the coating's final appearance. It is also difficult to provide adequate physical properties without applying multiple coating layers, each having their own cure regimen. In addition to achieving near-flawless appearance, automotive coatings must be durable and chip resistant, historically made possible by using multiple coating layers, each serving its own purpose.

The current state of the art automobile painting process involves electrophoretic application of a paint layer to the bare or treated metal substrate followed by fully curing the so-applied layer. A primer layer, whose purpose is primarily to provide chip resistance, UV opacity, and substrate filling (to smooth surface defects) is then applied, followed again by a full curing cycle. A colored basecoat layer is then applied, generally followed by a heated flash and then application of a final clearcoat layer. These two layers are then co-cured to produce the final coated article. There has been a tendency in the last decade to reduce the paint booth footprint, reduce the number of intermediate bake cycles and hence energy expenditure, reduce the number of coating layers and therefore system complexity, while maintaining the high level of optical quality and appearance of the resulting coated vehicles. The general name given to such modified paint processes is Compact Process.

In order to reduce layers, it is usually the primer layer and its associated oven that is eliminated, and the basecoat composition is then typically designed to incorporate some of the primer properties such as chip resistance and substrate filling. In this case the basecoat is typically applied in two layers with the composition of the first layer being modified to incorporate some heretofore primer-associated properties. After application of the two basecoat layers, a heated flash may be employed to remove some of the solvent and is followed by clearcoat application. The multi-component composite coating composition, or "coating stack", is then co-cured to provide the final article. In order to provide desired basecoat opacity and protection of the electrocoat layer, the sum of basecoat layer thicknesses is generally greater than the thickness of a basecoat applied over a fully baked conventional primer.

An alternate possibility is known as a 3C1B (3 coat-1 bake) process and involves keeping the primer layer per se, but removing the complete bake after the primer layer. The three layers (primer/basecoat/clearcoat) are applied wet-on-wet-on-wet, with or without heated intermediate flashes between layers, and co-cured in a single cure oven to produce the final article. This process maintains the functionality of the primer layer but removes the cost associated with the primer oven.

In the absence of polymers specifically designed for these Compact Process applications, issues like decreased pop and pinhole resistance due to increased solvent content, increased tendency of the coating stack to mud crack, decreased sag resistance, slumping of the basecoat layer, and/or increased interlayer strike-in, can result in worse optical appearance, poorer color control, and/or poorer process robustness.

Compact Coating systems that provide the desired physical and optical quality over a range of intermediate flash conditions are needed in order to accommodate the different processing parameters of different manufacturers. The system must also be designed to guarantee appearance consistency and quality at different locations on the same vehicle, which may undergo different process conditions during coating. Finally, manufacturers who currently employ heated intermediate flashes are constantly looking to reduce the temperature and time of these steps so they can reduce their energy expense and reduce their line footprint. For these reasons, it is desired to develop resins and coating compositions that provide coating system robustness and coating quality in a Compact Process while reducing process energy requirements.

SUMMARY OF THE INVENTION

The present invention is directed to a method for forming a composite coating on a substrate. The method comprises:
 (A) applying a first, waterborne coating composition to at least a portion of a surface of the substrate, the first coating composition comprising:
  (i) a polymeric component containing acid functional groups and additional functional groups different from the acid functional groups;
  (ii) a curing agent having functional groups reactive with the additional functional groups on the polymeric component; and
  (iii) microgel particles different from the polymeric component and curing agent, prepared in water from a diamine and an acid functional polyisocyanate, wherein the polyisocyanate contains an average of 0.75 acid functional groups per molecule and the wherein the polyisocyanate has at least three isocyanate functional groups; and
 (B) applying a second coating composition to at least a portion of the first coating formed in step (A) prior to substantially curing the first coating, to form a secondary coating thereon.

The present invention is further drawn to coated substrates comprising a substrate coated with the multi-component composite coating compositions formed from the methods described above.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the composition to curing conditions, wherein reaction of at least a portion of the reactive groups of the composition occurs, to form a polymerizate.

As used herein, "substantially uncured" means that the coating composition, after application to the surface of a substrate, forms a film which is substantially uncrosslinked; i.e., it is not heated to a temperature sufficient to induce significant crosslinking and there is substantially no chemical reaction between the polymeric component and the curing agent.

The term "reactive" refers to a functional group capable of undergoing a chemical reaction with itself and/or other functional groups spontaneously or upon the application of heat or in the presence of a catalyst or by any other means known to those skilled in the art.

By "polymer" is meant a polymer including homopolymers and copolymers, and oligomers. By "composite material" is meant a combination of two or more different materials.

The present invention is drawn to a method for forming a composite coating on a substrate. Substrates to which compositions of the present invention may be applied include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GAL-VANNEAL, and combinations thereof. Combinations or composites of ferrous and non-ferrous metals can also be used. The substrate may alternatively comprise a composite material such as a fiberglass composite. Car parts typically formed from thermoplastic and thermoset materials include bumpers and trim. It is desirable to have a coating system which can be applied to both metal and non-metal parts.

The shape of the metal substrate can be in the form of a sheet, plate, bar, rod or any shape desired, but it is usually in the form of an automobile part, such as a body, door, fender, hood or bumper. The thickness of the substrate can vary as desired.

Before depositing any coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, or both, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water or an aqueous solution of rinsing agents in order to remove any residue. The substrate can be air dried, for example, by using an air knife, by flashing off the water by brief exposure of the substrate to a high temperature or by passing the substrate between squeegee rolls.

In certain embodiments of the present invention, an initial step of forming an electrodeposited coating upon the surface of the substrate prior to applying the first coating composition of step (A) may be performed. Suitable electrodepositable coating compositions include conventional anionic or cationic electrodepositable coating compositions. Methods for electrodepositing coatings are well known to those skilled in the art and a detailed discussion thereof is not included here. Suitable compositions and methods are discussed in U.S. Pat. No. 5,530,043 (relating to anionic electrodeposition) and U.S. Pat. Nos. 5,760,107; 5,820,987 and 4,933,056 (relating to cationic electrodeposition) which are hereby incorporated by reference in their entireties. The electrodeposited coating is usually cured prior to the application of the first coating composition. Curing conditions may be those typically used for electrodeposited coating compositions. After curing the electrodeposited coating, the first coating composition may then be applied directly onto the electrodeposited coating.

In step (A) of the process of the present invention, a first, waterborne coating composition is applied to at least a portion of a surface of the substrate. The first coating composition comprises:
 (a) a polymeric component containing acid functional groups and an additional functional group different from the acid functional groups;

(b) a curing agent having functional groups reactive with the additional functional groups on the polymeric component; and (c) microgel particles different from the polymeric component and curing agent.

The polymeric component (a) may comprise any suitable polymers known in the art of surface coatings. Particularly useful polymeric film-forming resins suitable in the polymeric component (a) are acrylic polymers, polyesters, including alkyds, polyethers, and/or polyurethanes. Generally these polymers can be any polymers of these types made by any method known to those skilled in the art where the polymers are water dispersible or emulsifiable and preferably of limited water solubility. The polymeric component contains acid functional groups, which aid in the dispersibility of the polymer in an aqueous medium.

Suitable acrylic polymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, such as 4 to 18, carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl)acrylamides and N-(alkoxymethyl)methacrylamides.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are preferred. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers (or used to impart acid functionality to the acrylic polymer) include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl) phenyl glycidyl ether. Particularly suitable glycidyl esters include those of the structure:

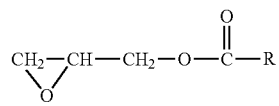

where R is a hydrocarbon radical containing from about 4 to about 26 carbon atoms. Usually, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other useful carbamate functional monomers are disclosed in U.S. Pat. No. 5,098,947, which is incorporated herein by reference. Other useful carbamate functional monomers are disclosed in U.S. Pat. No. 5,098,947.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of the coating compositions, or can be prepared via organic solution polymerization techniques with groups capable of salt formation such as acid or amine groups. Upon neutralization of these groups with a base or acid the polymers can be dispersed into aqueous medium. Generally any method of producing such polymers that is known to those skilled in the art utilizing art recognized amounts of monomers can be used.

Besides acrylic polymers, the polymeric film-forming resin suitable as the polymeric component (a) in the first coating composition may be an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Useful alkyd resins include polyesters of polyhydroxyl alcohols and polycarboxylic acids chemically combined with various drying, semi-drying and non-drying oils in different proportions. Thus, for example, the alkyd resins are made from polycarboxylic acids such as phthalic acid, maleic acid, fumaric acid, isophthalic acid, succinic acid, adipic acid, azelaic acid, sebacic acid as well as from anhydrides of such acids, where they exist. The polyhydric alcohols which can be reacted with the polycarboxylic acid include 1,4-butanediol, 1,6-hexanediol, neopentyl glycol, ethylene glycol, diethylene glycol and 2,3-butylene glycol, glycerol, trimethylolpropane, pentaerythritol, sorbitol and mannitol.

The alkyd resins are produced by reacting the polycarboxylic acid and the polyhydric alcohol together with a drying, semi-drying or non-drying oil in proportions depending upon the properties desired. The oils are coupled into the resin molecule by esterification during manufacturing and become an integral part of the polymer. The oil is fully saturated or predominately unsaturated. When cast into films, fully saturated oils tend to give a plasticizing effect to the film, whereas predominately unsaturated oils tend to crosslink and dry rapidly with oxidation to give more tough and solvent resistant films. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties as is well known in the art.

Carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as amide, thiol, urea, and thiocarbamate_may be incorporated into the polyester or alkyd resin as desired using suitably functional reactants if available, or conversion reactions as necessary to yield the desired functional groups. Such techniques are known to those skilled in the art.

Examples of polyether polyols are polyalkylene ether polyols which include those having the following structural formula:

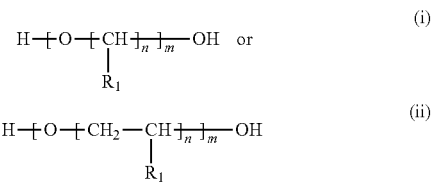

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E.I. Du Pont de Nemours and Company, Inc., and POLYMEG, available from Q O Chemicals, Inc., a subsidiary of Great Lakes Chemical Corp.

Pendant carbamate functional groups may be incorporated into the polyethers by a transcarbamoylation reaction. Other functional groups such as acid, amine, epoxide, amide, thiol, and urea may be incorporated into the polyether as desired using suitably functional reactants if available, or conversion reactions as necessary to yield the desired functional groups.

Polyurethanes can also be used as the polymeric component (a) in the first coating composition. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2, 4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups such as amide, thiol, urea, and thiocarbamate_may be incorporated into the polyurethane as desired using suitably functional reactants if available, or conversion reactions as necessary to yield the desired functional groups. Such techniques are known to those skilled in the art.

In a typical embodiment of the present invention, a mixture of acrylic and polyester polymers, each having both acid- and hydroxyl-functional groups, are used in the polymeric component (a). Generally, the polymeric component is present in the first coating composition in an amount ranging from about 10 to about 90 percent by weight based on the total weight of resin solids in the first coating composition, usually about 20 to about 80 percent by weight and, more often, about 30 to about 70 percent by weight.

The first coating composition further comprises a curing agent (b) having functional groups reactive with the additional functional groups on the polymeric component. Suitable curing agents include aminoplasts, polyisocyanates, and mixtures thereof. Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541.

The aminoplast resins often contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, mono-ethers of glycols, and halogen-substituted or other substituted alcohols such as 3-chloropropanol and butoxyethanol. Many aminoplast resins are partially alkylated with methanol or butanol.

The polyisocyanate which may be utilized as a curing agent can be prepared from a variety of isocyanate-containing materials. Often, the polyisocyanate is a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures such as lower aliphatic alcohols including methanol, oximes such as methyl ethyl ketoxime, lactams such as caprolactam and pyrazoles such as di methylpyrazole.

Generally, the curing agent is present in the first coating composition in an amount ranging from about 5 to about 50 percent by weight based on the total weight of resin solids in the first coating composition, usually about 10 to about 40 percent by weight and, more often, about 15 to about 30 percent by weight.

The first coating composition used in the process of the present invention further comprises (c) microgel particles different from the polymeric component and curing agent. The microgel particles are usually present in an amount of 10 to 40 percent by weight, often 20 to 30 percent by weight, based on the total weight of resin solids in the first coating composition. The microgel particles are typically prepared by reacting a diamine and a polyisocyanate. Suitable diamines include any that have a solubility in water greater than or equal to that of ethylene diamine, for example, ethylene diamine itself, aminoethylethanolamine, hydrazine, and the like. Suitable polyisocyanates contain an average of 0.75 acid functional group per molecule and at least three isocyanate functional groups. The microgel particles are typically prepared in water, and the acid functional group on the polyisocyanate molecule helps to minimize the formation of solid precipitates in the reaction medium and coating composition commonly referred to as grit. Suitable acid functional polyisocyanates may be prepared by reacting a polyisocyanate with an acid functional polyol or polyamine.

The polyisocyanates are generally prepared by reacting an excess of isocyanate with a mixture of polyols including a difunctional and trifunctional polyol and a polyol containing an acid functional group. These are reacted together until the isocyanate equivalent weight is constant. The mole ratios are chosen such that the ensuing polyisocyanate is statistically minimum trifunctional or contains statistically one branch point per polymer chain, and contains at minimum 0.75 acid functional groups per polymer chain. The preparation of an exemplary acid functional polyisocyanate is demonstrated in the Examples below.

In the preparation of the microgel particles, the polyisocyanate is added to an aqueous solution of tertiary amine such as dimethylethanolamine to form a dispersion. Then the diamine is added to the dispersion as a chain extender, forming internally crosslinked microparticles dispersed in an aqueous medium. The reaction may be conducted at room temperature, although higher temperatures are possible if necessary.

The first coating composition can include a variety of optional ingredients and/or additives that are somewhat dependent on the particular application of the curable composition, such as curing catalysts, pigments including titanium dioxide, carbon black or graphite, reinforcements, additional thixotropes, accelerators, surfactants, plasticizers, extenders, stabilizers, corrosion inhibitors, diluents, and antioxidants.

The film-forming composition used as the first coating layer may include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

In general, the colorant can be present in the film-forming composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

The first coating composition, and all subsequent coating layers, may be applied to the substrate by one or more of a number of methods including spraying, rolling, curtain coating, dipping/immersion, brushing, or flow coating, but they are most often applied by spraying. The usual spray techniques and equipment for air spraying and electrostatic spraying and either manual or automatic methods can be used. The first coating layer typically has a dry (film thickness of 15 to 30 microns.

After forming a film of the first coating layer on the substrate, the first coating layer can be given a drying step in which solvent is driven out of the coating film by heating or an air drying period at room temperature before application of the second coating composition. Suitable drying conditions may depend, for example, on the ambient temperature and humidity. Alternatively, the second coating composition may be applied immediately to the first without drying the first coating. In any event, the second coating composition is applied to at least a portion of the uncured first coating formed in step (A) prior to substantially curing the first coating, forming a substantially uncured secondary coating thereon. Such a coating process is often referred to as "wet-on-wet".

The second coating composition may be applied to the first coating layer using any of the methods described above.

The second coating composition may be any of those known in the art of surface coatings; it is typically a curable film-forming composition comprising a polymeric binder with functional groups and a curing agent having functional groups reactive with those on the polymeric binder. It may be waterborne or solventborne, though it is typically waterborne so as to maximize surface compatibility with the first coating composition. It may be the same as or different from the first coating composition. If it has the same resin composition as the first coating composition, it may be the same color or a different color. It may alternatively be transparent; i.e., a clearcoat. Like the film-forming composition used as the first coating layer, the second coating composition can include a variety of optional ingredients and/or additives such as curing catalysts, pigments or other colorants, reinforcements, thixotropes, accelerators, surfactants, plasticizers, extenders, stabilizers, corrosion inhibitors, diluents, hindered amine light stabilizers, UV light absorbers, and antioxidants.

After application of the second coating composition to the first, forming a composite coating on the substrate, the coated substrate may be held at a temperature and for a time sufficient to substantially cure the composite coating after all coating layers have been applied to the substrate. Such cure protocols typically include a temperature range of 70 to 180° C. for a time of 10 to 120 minutes.

The second coating layer typically has a dry film thickness of 10 to 25 microns.

In certain embodiments of the present invention, the process may include a subsequent step (C) of applying a clear coating composition to at least a portion of the uncured secondary coating formed in step (B) prior to substantially curing the secondary coating, to form a substantially uncured clear coating thereon. The clear coating composition may be applied to the secondary coating layer using any of the methods described above. It may be applied to the wet secondary coating, or the secondary coating may be held for an ambient or elevated temperature flash prior to application of the clear coating composition in step (C). The flash may be at the same temperature and duration as that between steps (A) and (B), or either or both aspects of the flash may be different.

The clear coating composition may be any of those known in the art of surface coatings; it is typically a curable film-forming composition comprising a polymeric binder with functional groups and a curing agent having functional groups reactive with those on the polymeric binder. It may be the same as or different from either of the previously applied coating compositions. Like the other film-forming compositions, the clear coating composition can include a variety of optional ingredients and/or additives such as curing catalysts, reinforcements, thixotropes, accelerators, surfactants, plasticizers, extenders, stabilizers, corrosion inhibitors, diluents, hindered amine light stabilizers, UV light absorbers, and antioxidants.

After application of the clear coating composition to the secondary coating composition, the coated substrate may be held at a temperature and for a time sufficient to substantially cure the composite coating after all coating layers have been applied to the substrate. Such cure protocols may be the same as or different from that used previously.

The clear coating layer applied in step (C) typically has a dry film thickness of 30 to 50 microns.

Coated substrates prepared in accordance with the method of the present invention demonstrate improved pop resistance, pinhole resistance, and/or mudcracking resistance during curing compared to coated substrates prepared using conventional processes or other compact processes. This is in part due to the composition of the first coating layer and the lower overall number and/or thicknesses of coating layers achievable by the process of the present invention. The total thickness of a composite coating prepared by the process of the present invention is typically 25 to 105 microns, depending on the total number of applied layers.

The following examples are intended to illustrate various embodiments of the invention, and should not be construed as limiting the invention in any way.

EXAMPLES

Example 1 demonstrates the preparation of a polyisocyanate for use in the preparation of a microgel used in the compositions of the present invention. The polyisocyanate was divided into two samples; the first was dispersed in water and chain extended with aminoethylethanolamine (AEEA) as shown in Example 2. The second was dispersed in water and chain extended with ethylene diamine (EDA) as shown in Example 3.

Example 1

Polyisocyanate

| Charge | Name | Wt. (g) |
| --- | --- | --- |
| 1 | 1,4-Butanediol | 27 |
|   | Poly THF 650 | 243.8 |
|   | Dimethylolpropionic acid | 30.2 |
|   | Trimethylolpropane | 40.2 |
|   | Isophorone diisocyanate | 399.6 |
|   | MEK (60% TS) | 493.8 |
|   | Dibutyltindilaurate | 0.8 |

The ingredients of Charge 1 were mixed together in a suitable reactor with stirring under a nitrogen blanket. The mixture was heated to 60° C. After the exotherm was complete, the mixture was heated to 80° C. and held for at least 6 hours, or until the isocyanate equivalent weight was constant. The measured NCO equivalent weight was 1358. The mixture was cooled to 40° C., then divided into two samples for dispersion. Microgel 1 was prepared by chain extension of the NCO functional prepolymer with aminoethylethanolamine, and Microgel 2 was prepared by chain extension with ethylenediamine Example 2

Microgel 1

| Charge | Name | Wt. (g) |
| --- | --- | --- |
| 1 | Polyisocyanate of Example 1 | 550 |
| 2 | DMEA | 8 |
|   | DI Water | 154 |
| 3 | DI Water | 366 |
| 4 | Aminoethylethanolamine | 20 |
|   | DI Water | 100 |

Example 3

Microgel 2

| Charge | Name | Wt. (g) |
| --- | --- | --- |
| 1 | Polyisocyanate of Example 1 | 550 |
| 2 | DMEA | 8 |
|   | DI Water | 154 |
| 3 | DI Water | 366 |
| 4 | EDA | 11.5 |
|   | DI Water | 100 |

The prepolymer of Charge 1 was added to an appropriate sized 4-necked round bottom flask and held at 40 C. Charges 2 & 3 were added alternately to the NCO prepolymer solution at 40° C. to generate a fine particle size, nearly transparent dispersion. After the dispersion step was complete, the mixture was stirred for 10 minutes. Charge 4 was then added over 30 minutes with stirring. Upon completion of the chain extension step, the MEK was removed by vacuum distillation. The final solids content of Microgel 1 was 38% and the final solids content of Microgel 2 was 41%.

Waterborne Coating Compositions Prepared with Microgel

Primer coatings were prepared by first producing a common grind paste made with the following ingredients:

Example 4

Grind Paste

| Charge | Name | Wt. (g) |
|---|---|---|
| 1 | WF 236 Polyester[1] | 52.5 |
|  | DI Water | 6.3 |
|  | DMEA | 0.22 |
|  | SN-1222NSK[2] | 0.63 |
|  | Carbon Black MA-100[3] | 0.58 |
|  | Titanium Dioxide | 67.2 |
|  | Barium Sulfate | 21 |
|  | Benzoin | 4.2 |
|  | DI Water | 18 |

[1]Available from PPG Industries
[2]Available from San Nopco Ltd.
[3]Available from Mitsubishi Chemical These ingredients were first dispersed with a high speed Cowles dissolver for 1 hour. The premix was then milled for 1.5 hrs with an Eiger Media mill. This paste was then used in the production of Examples 5 and 6. To produce the paints the following ingredients were added in order with mixing. The final mixture was then agitated for 15 minutes.

Primer coating compositions in accordance with the present invention were prepared as shown below:

Example 5

Coating

| Charge | Name | Wt. (g) |
|---|---|---|
| 1 | Grind Paste of Example 4 | 171.6 |
|  | DI Water | 20.5 |
|  | ZD-364 WB Acrylic[1] | 8.2 |
|  | Additive 200 Soln[2] | 2.1 |
|  | WF-535 Polyester[3] | 22.8 |
|  | MYCOAT KC-8021[4] | 35.6 |
|  | Disparlon AQ-8021[5] | 0.5 |
|  | WK-905 WB Acrylic[6] | 1 |
|  | Surfynol 104A[7] | 5.1 |
|  | WB-067 WB Acrylic[8] | 30.8 |
|  | 2-Ethylhexylacetate | 10.3 |
|  | Monocizer W-262[9] | 7.7 |
|  | Example 2 (Microgel) | 65.8 |
|  | Additive 68 Soln[10] | 2 |
|  | 50/50 DMEA/DI Water | 2.5 |
|  | DI Water | 62.8 |

[1]Waterborne acrylic resin available from PPG Industries
[2]Available from PPG Industries
[3]Waterborne polyester resin available from PPG Industries
[4]Melamine/formaldehyde resin available from Cytec
[5]Acrylic/silicone polymer solution available from Kusumoto
[6]Waterborne acrylic resin solution available from PPG Industries
[7]Available from Air Products
[8]Waterborne acrylic resin solution available from PPG Industries
[9]Available from Dainippon Ink & Chemical
[10]Available from PPG Industries.

The final paint had a solids content of 46% at application viscosity of 26 seconds #4 Ford Cup.

Example 6

Coating

| Charge | Name | Wt. (g) |
|---|---|---|
| 1 | Grind Paste of Example 4 | 171.6 |
|  | DI Water | 20.5 |
|  | ZD-364 WB Acrylic[1] | 8.2 |
|  | Additive 200 Soln[2] | 2.1 |
|  | WF-535 Polyester[3] | 22.8 |
|  | MYCOAT KC-8021[4] | 35.6 |
|  | Disparlon AQ-8021[5] | 0.5 |
|  | WK-905 WB Acrylic[6] | 1 |
|  | Surfynol 104A[7] | 5.1 |
|  | WB-067 WB Acrylic[8] | 30.8 |
|  | 2-Ethylhexylacetate | 10.3 |
|  | Monocizer W-262[9] | 7.7 |
|  | Example 3 (Microgel) | 59.4 |
|  | Additive 68 Soln[10] | 2 |
|  | 50/50 DMEA/DI Water | 2.5 |
|  | DI Water | 62.8 |

[1]Waterborne acrylic resin available from PPG Industries
[2]Available from PPG Industries
[3]Waterborne polyester resin available from PPG Industries
[4]Melamine/formaldehyde resin available from Cytec
[5]Acrylic/silicone polymer solution available from Kusumoto
[6]Waterborne acrylic resin solution available from PPG Industries
[7]Available from Air Products
[8]Waterborne acrylic resin solution available from PPG Industries
[9]Available from Dainippon Ink & Chemical
[10]Available from PPG Industries.

The final paint had a solids content of 45% at application viscosity of 26 seconds #4 Ford Cup.

The waterborne coating compositions of these examples were tested in a 3C1B type process versus a control coating composition wherein the primer was prepared according to U.S. Pat. No. 6,180,181. The test substrates were HIA GALVANNEAL steel panels coated with high edge electrocoat (ED6450 from PPG Industries). The primer coating composition of each example was spray applied with an electrostatic bell (1 coat application, target dry film thickness 20 microns) at 60% relative humidity and 21° C. After application of the primer layer, one set of panels was held at ambient conditions for 5 minutes prior to basecoat application, the other set of panels was partially dehydrated by flashing at 80° C. for 5 minutes prior to basecoat application. This range of processing conditions brackets the commercially envisioned conditions, and the robustness or invariance of final topcoat appearance/color control at these two processing condition limits is used to evaluate the quality of the primer coating. All of the panels were then coated (2 coats automated spray at 13 microns) with a light blue metallic basecoat known as JWBW8R3 (commercially available from PPG-Kansai Automotive Finishes). The panels are then flash baked for 5 minutes at 80° C. and then topcoated (2 coats automated spray at 45 microns) with a clearcoat, Kino JCC1200 (commercially available from PPG-Kansai Automotive Finishes). The panels were then baked for 10 minutes at 110° C., and then 20 minutes at 140° C. Defects such as pop/pinhole/mudcracking/sagging were not observed.

The smoothness of the basecoats was measured with a Byk—WAVESCAN and the results are reported as Wa/Wb/Wc/Wd/We. These values indicate the degree of smoothness as a function wavelength. The Wa measurement is for short wavelength structure (0.01-0.3 mm). Wc for intermediate wavelengths (1-3 mm) and We for longer wavelength structures (10-30 mm). Improved smoothness at the shorter wavelength structure (Wa-Wb) is a particularly important property for an automotive coating. Lower values indicate a smoother film.

| Appearance Consistency vs. Processing Condition | | | | | | | |
|---|---|---|---|---|---|---|---|
| | Condition | Wa | Wb | Wc | Wd | We | DOI |
| Example 5 | 5 min ambient | 19 | 43 | 28 | 17 | 15 | 86 |
| | 5 min @ 80 C. | 21 | 42 | 25 | 17 | 14 | 86 |
| Example 6 | 5 min ambient | 34 | 53 | 29 | 19 | 15 | 81 |
| | 5 min @ 80 C. | 20 | 43 | 29 | 19 | 15 | 85 |
| Control* | 5 min ambient | 38 | 53 | 38 | 31 | 25 | 81 |
| | 5 min @ 80 C. | 21 | 41 | 25 | 16 | 14 | 85 |

*The control was a coating composition prepared as described in U.S. Pat. No. 6,180,181; example 7

The optical properties of the basecoats were measure with an X-Rite and the results are reported as L value (lightness) as a function of the viewing angle (15° to 115° from perpendicular).

| Color Consistency vs. Processing Condition | | | | | | | |
|---|---|---|---|---|---|---|---|
| | Condition | Flop Index | L15 | L25 | L45 | L75 | L115 |
| Example 5 | 5 min ambient | 11.7 | 62 | 50.1 | 30 | 15.6 | 9.6 |
| | 5 min @ 80 C. | 11.4 | 60.9 | 49.1 | 29.8 | 15.7 | 9.8 |
| Example 6 | 5 min ambient | 11.5 | 60.4 | 49.2 | 29.6 | 15.5 | 9.5 |
| | 5 min @ 80 C. | 12 | 63.5 | 50.5 | 30 | 15.6 | 9.8 |
| Control* | 5 min ambient | 12 | 63.3 | 51.1 | 30.2 | 15.5 | 9.4 |
| | 5 min @ 80 C. | 12.4 | 64.6 | 51.6 | 30 | 15.3 | 9.5 |

*The control was a coating composition prepared as described in U.S. Pat. No. 6,180,181; example 7

It can be seen from the tables that Microgel 1 of the present invention produces a primer layer that provides an improved and more robust appearance profile of the multilayer coating stack at the two different processing conditions.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A method for forming a composite coating on a substrate comprising:
   (A) applying a first, waterborne coating composition to at least a portion of a surface of the substrate, the first coating composition comprising:
   (i) a polymeric component containing acid functional groups and additional functional groups different from the acid functional groups;
   (ii) a curing agent having functional groups reactive with the additional functional groups on the polymeric component; and
   (iii) microgel particles different from the polymeric component and curing agent, prepared in water from a diamine and an acid functional polyisocyanate, wherein the polyisocyanate contains an average of 0.75 acid functional groups per molecule and the wherein the polyisocyanate has at least three isocyanate functional groups; and
   (B) applying a second coating composition to at least a portion of the first coating formed in step (A) prior to subjecting the first coating to curing conditions, to form a secondary coating thereon.

2. The method of claim 1, wherein the diamine used to prepare the microgel particles (c) has a solubility in water greater than or equal to that of ethylene diamine.

3. The method of claim 2, wherein the diamine used to prepare the microgel particles (c) comprises aminoethylethanolamine.

4. The method of claim 1, wherein the first coating layer is applied over the substrate to yield a dry film thickness of 15 to 30 microns.

5. The method according to claim 1, further comprising an initial step of forming an electrodeposited coating upon the surface of the substrate prior to applying the first coating composition of step (A), wherein the first coating composition is applied directly onto the electrodeposited coating.

6. The method of claim 1, further comprising: (C) applying a clear coating composition to at least a portion of the secondary coating applied in step (B) prior to subjecting the secondary coating to curing conditions, to form a clear coating thereon.

7. The method according to claim 6, further comprising: (D) holding the substrate at a temperature and for a time sufficient to cure the composite coating after all coating layers have been applied to the substrate.

8. The method according to claim 1, further comprising: (C) holding the substrate at a temperature and for a time sufficient to cure the composite coating after all coating layers have been applied to the substrate.

* * * * *